US012723185B2

(12) United States Patent
Jee et al.

(10) Patent No.: US 12,723,185 B2
(45) Date of Patent: Sep. 1, 2026

(54) COMPOSITE ABRASIVE, METHOD OF PREPARING SAME, POLISHING SLURRY INCLUDING SAME, AND METHOD OF MANUFACTURING SEMICONDUCTOR DEVICE

(71) Applicant: Samsung Electronics Co., Ltd., Suwon-si (KR)

(72) Inventors: Sang Soo Jee, Suwon-si (KR); Eun Sung Lee, Suwon-si (KR); Junghoon Lee, Suwon-si (KR); Youngnam Kwon, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 468 days.

(21) Appl. No.: 18/312,329

(22) Filed: May 4, 2023

(65) Prior Publication Data

US 2023/0357616 A1 Nov. 9, 2023

(30) Foreign Application Priority Data

May 6, 2022 (KR) ........................ 10-2022-0056054

(51) Int. Cl.
*C09K 3/14* (2006.01)
*C09G 1/02* (2006.01)

(52) U.S. Cl.
CPC .............. *C09K 3/1409* (2013.01); *C09G 1/02* (2013.01)

(58) Field of Classification Search
CPC .. C09K 3/1436; C09K 3/1409; C09K 3/1454; B24B 37/22; B24B 37/24; B24B 37/245;
(Continued)

(56) References Cited

U.S. PATENT DOCUMENTS 5,861,054 A 1/1999 Miyashita et al.
6,179,886 B1 1/2001 Gordeev et al.
(Continued)

FOREIGN PATENT DOCUMENTS

CN 215318118 U * 12/2021
JP H07-101828 A 4/1995
(Continued)

OTHER PUBLICATIONS

Machine translation of CN-215318118-U (Year: 2021).*
(Continued)

*Primary Examiner* — Amber R Orlando
*Assistant Examiner* — Ryan Patrick Loughran
(74) *Attorney, Agent, or Firm* — Harness, Dickey & Pierce, P.L.C.

(57) ABSTRACT

Provided are a composite abrasive, a method of preparing same, polishing slurry including same, and a method of manufacturing a semiconductor device using the polishing slurry, the composite abrasive including a host material and abrasive particles protruding from the surface of the host material. The host material may have a Mohs hardness smaller than a Mohs hardness of the abrasive particles. The host material may have a two-dimensional planar structure and/or a layered structure. A binding force between the host material and the abrasive particles may be greater than or equal to about 200 nN.

20 Claims, 17 Drawing Sheets

(58) Field of Classification Search
CPC ......... C09G 1/02; C09G 1/00; H01L 21/3212; H01L 21/30625; H01L 21/304
See application file for complete search history.

(56) References Cited

U.S. PATENT DOCUMENTS

| | | | | |
|---|---|---|---|---|
| 9,281,210 | B2 | 3/2016 | Reiss et al. | |
| 9,707,529 | B2 | 7/2017 | Josseaux | |
| 9,914,198 | B2 * | 3/2018 | Sarangi .................... | B24D 3/18 |
| 2002/0111027 | A1 | 8/2002 | Sachan et al. | |
| 2004/0216388 | A1 | 11/2004 | Mathur et al. | |
| 2015/0104939 | A1 | 4/2015 | Reiss et al. | |
| 2016/0040040 | A1 | 2/2016 | Purkayastha et al. | |
| 2021/0071035 | A1 | 3/2021 | Takai et al. | |
| 2022/0235252 | A1 | 7/2022 | Nam et al. | |

FOREIGN PATENT DOCUMENTS

| | | | |
|---|---|---|---|
| JP | 2001-332517 | A | 11/2001 |
| JP | 2004-514266 | A | 5/2004 |
| KR | 100259936 | B1 | 6/2000 |
| KR | 101613359 | B1 | 4/2016 |
| KR | 2019-0080616 | A | 7/2019 |
| KR | 2019-0080620 | A | 7/2019 |
| KR | 2021-0031328 | A | 3/2021 |
| KR | 102261151 | B1 | 6/2021 |
| KR | 102283152 | B1 | 7/2021 |
| WO | 2004/083328 | A2 | 9/2004 |

OTHER PUBLICATIONS

Compound Interest, Mohs Hardness (Year: 2022).*

Extended European Search Report dated Feb. 2, 2024 for corresponding European Application No. 23171624.2.

Chuanjin Huang et al., “Effect of OH on chemical mechanical polishing of B—$Ga_2O_3$ (100) substrate using an alkaline slurry”, RSC Advances, 8, 6544, 2018, DOI: 10.1039/c7ra11570a.

Tae-Young Kwon et al., Scratch formation and its mechanism in chemical mechanical planarization (CMP), Friction 1(4): 279-305, 2013, DOI: 10.1007/s40544-013-0026-y.

Xin-Ping Qu, et al., “Chemical Mechanical Polishing of Mo Using $H_2O_2$ as Oxidizer in Collodial Silica Based Slurries”, ECS Journal of Solid State Science and Technology, 6 (7) P470-P476, 2017.

Chenna Rao Borra et al., “Recovery of Cerium from Glass Polishing Waste: A Critical Review”, Metals, 8, 801, 2018, DOI: 10.3390/met8100801.

Hyunseop Lee, “Semi-empirical Material Removal Model with Modified Real Contact Area for CMP”, International Journal of Precision Engineering and Manufacturing, 20: 1325-1332, 2019, https://doi.org/10.1007/s12541-019-00161-6.

Hyunseop Lee, “Semi-empirical Material Removal Model with Modified Real Contact Area for CMP”, International Journal of Precision Engineering and Manufacturing, vol. 20, pp. 1325-1332, 2019—Abstract Only.

Tae Zhang et al. “Nacre-inspired polymer composites with high thermal conductivity and enhanced mechanical strength” Composites Part A, 121, 92-99, 2019.

European Communication dated Jan. 27, 2026 for corresponding European Application No. 23171624.2.

* cited by examiner

COMPOSITE ABRASIVE, METHOD OF PREPARING SAME, POLISHING SLURRY INCLUDING SAME, AND METHOD OF MANUFACTURING SEMICONDUCTOR DEVICE

CROSS-REFERENCE TO RELATED APPLICATION

This application claims priority to and the benefit of Korean Patent Application No. 10-2022-0056054 filed in the Korean Intellectual Property Office on May 6, 2022, the entire contents of which are incorporated herein by reference.

BACKGROUND

1. Field

Example embodiments relate to composite abrasives, methods of preparing same, polishing slurries including same, and methods of manufacturing a semiconductor device.

2. Description of the Related Art

A semiconductor device requires a structure with a flat surface during the manufacturing process, wherein this structure may be formed by a polishing process. For example, the polishing process may include chemical mechanical polishing (CMP). The chemical mechanical polishing is a process of planarizing the surface of a semiconductor substrate after providing polishing slurry including abrasive particles between the semiconductor substrate for the polishing process and a polishing pad, contacting the semiconductor substrate with the polishing pad, and then, rotating and pressing it.

SUMMARY

Recently, a high-performance, highly integrated semiconductor device requires a structure having a fine pitch of about 10 nm or less. Conventional polishing slurry including abrasive particles having a particle diameter of several tens of nanometers may cause damages on the surface (e.g., surface scratches) and shape deformation of the fine pitch structure. Accordingly, in order to effectively polish the fine pitch structure, fine abrasive particles having several nanometers of a particle diameter is being researched instead of the conventional abrasive particles having several tens of nanometers of a particle diameter. However, since these fine abrasive particles have a low polishing rate, it is necessary to improve the polishing performance thereof.

Some example embodiments provide a composite abrasive capable of improving a polishing rate and polishing efficiency as well as reducing the damages (e.g., surface scratches) and shape deformation of the structure.

Some example embodiments provide a method of preparing the composite abrasive.

Some example embodiments provide a polishing slurry including the composite abrasive.

Some example embodiments provide a method of manufacturing a semiconductor device using the polishing slurry.

According to some example embodiments, a composite abrasive may include a host material having a two-dimensional planar structure and/or a layered structure (a two-dimensional planar structure, a layered structure, or both) and abrasive particles protruding from a surface of the host material, wherein the host material has a Mohs hardness smaller than a Mohs hardness of the abrasive particles.

The host material may have a Mohs hardness of less than or equal to about 5 and the abrasive particles may have a Mohs hardness greater than about 5.

A difference in Mohs hardness between the Mohs hardness of the host material and the Mohs hardness of the abrasive particles may be greater than or equal to about 4.

A binding force between the host material and the abrasive particles may be greater than or equal to about 200 nN.

The host material may have an aspect ratio of about 3:1 to about 1000:1.

The host material may have a size of about 50 nm to about 100 μm.

The host material may have an anisotropic structure.

The host material may include an inorganic material.

The host material may include graphite, graphene, graphene oxide, hexagonal boron nitride (h-BN), or any combination thereof.

The abrasive particles may include oxide, nitride, fluoride, carbide, or any combination thereof.

The oxide may include silicon oxide, cerium oxide, titanium oxide, zirconium oxide, aluminum oxide, molybdenum oxide, ruthenium oxide, tantalum oxide, tungsten oxide, or any combination thereof, the nitride may include silicon nitride, aluminum nitride, titanium nitride, boron nitride (cubic structure), or any combination thereof, the fluoride may include calcium fluoride ($CaF_2$), selenium fluoride ($SeF_4$), tellurium fluoride ($TeF_4$), or any combination thereof, and the carbide may include tantalum carbide, boron carbide, or any combination thereof.

The abrasive particles may have a size of less than or equal to about 100 nm.

The abrasive particles may be included in the composite abrasive in an amount of about 0.01 wt % to about 10 wt % based on a total amount of the composite abrasive.

According to some example embodiments, a composite abrasive may include a host material and abrasive particles protruding from a surface of the host material, wherein a binding force between the host material and the abrasive particles is greater than or equal to about 200 nN.

The host material may have a two-dimensional planar structure and/or a layered structure.

According to some example embodiments, a method of preparing a composite abrasive may include dissolving a precursor of abrasive particles in a solvent to prepare a solution; and dispersing a host material having a two-dimensional planar structure and/or layered structure in the solution, and performing a heat treatment of the host material dispersed in the solution to obtain the composite abrasive.

The precursor of the abrasive particles may be a metal salt, a hydrate thereof, or any combination thereof, and the metal salt may include, for example, a metal-containing carboxylate, a metal-containing halide, a metal-containing nitrate, a metal-containing oxalate, a metal-containing alkoxide, or any combination thereof.

The solution including the precursor of the abrasive particles may further include a reducing agent.

The heat treatment may be performed at about 60° C. to about 800° C.

According to some example embodiments, a polishing slurry may include the aforementioned composite abrasive.

The composite abrasive may be included in the polishing slurry in an amount of about 0.01 wt % to about 10 wt % based on a total amount of the polishing slurry.

The polishing slurry may include a plurality of composite abrasives, the plurality of composite abrasives including the composite abrasive, the plurality of composite abrasives each including the host material, and the host material of the plurality of composite abrasives may have a thickness variation of less than or equal to about 100 nm.

In the polishing slurry, the composite abrasive may have a two-dimensional planar structure and/or a layered structure of the host material.

The polishing slurry may further include a chelating agent, an oxidizing agent, a surfactant, a dispersant, a pH adjusting agent, or any combination thereof.

According to some example embodiments, a method of manufacturing a semiconductor device may include arranging a semiconductor substrate and a polishing pad to face each other; supplying the polishing slurry between the semiconductor substrate and the polishing pad; bringing the polishing pad into contact with the surface of the semiconductor substrate; and performing polishing of the surface of the semiconductor substrate.

The supplying of the polishing slurry may include supplying the polishing slurry at a rate of about 10 ml/min to about 1000 ml/min.

The polishing may include applying a pressure of about 1 psi to about 100 psi.

The polishing slurry may polish a metal wire in the semiconductor substrate.

The polishing rate and polishing efficiency may be improved while reducing damage such as scratches and shape deformation of the fine pitch structure.

DETAILED DESCRIPTION

Figure 1:
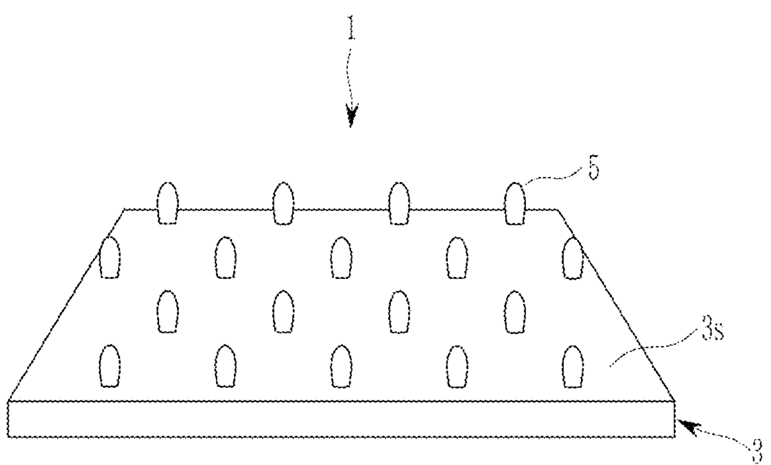
FIG. 1 is a schematic view of a composite abrasive according to some example embodiments.

Hereinafter, some example embodiments are described in detail so that those of ordinary skill in the art can easily implement them. However, a structure that is actually applied may be implemented in various different forms, and is not limited to the example embodiments described herein.

The terminology used herein is used to describe some example embodiments only, and is not intended to limit the present inventive concepts. The singular expression includes the plural expression unless the context clearly dictates otherwise.

As used herein, "a combination thereof" refers to a mixture, a laminate, a composite, a copolymer, an alloy, a blend, a reaction product, and/or the like of constituents.

As used herein, "metal" may include a semi-metal as well as a metal.

As used herein, "Mohs hardness" is a relative value compared with reference materials (refer to https://en.wikipedia.org/wiki/Mohs_scale).

Herein, it should be understood that terms such as "comprises," "includes," or "have" are intended to designate the presence of an embodied feature, number, step, element, or a combination thereof, but does not preclude the possibility of the presence or addition of one or more other features, number, step, element, or a combination thereof.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it may be directly on the other element or intervening elements may also be present. In contrast, when an element is referred to as being "directly on" another element, there are no intervening elements present.

It will further be understood that when an element is referred to as being "on" another element, it may be above or beneath or adjacent (e.g., horizontally adjacent) to the other element.

In addition, the term "layer" as used herein includes not only a shape formed on the whole surface when viewed from a plan view, but also a shape formed on a partial surface.

As used herein, "size" means an average particle diameter in the case of a sphere and the length of the longest portion in the case of a non-spherical shape. In addition, the size may be measured by a method well known to those skilled in the art, for example, may be measured by a particle size analyzer, or may be measured by a transmission electron micrograph or a scanning electron micrograph. In some example embodiments, it is possible to obtain an average particle diameter value by measuring utilizing a dynamic light scattering method, performing data analysis, counting the number of particles for each particle size range, and calculating from these data.

Unless otherwise defined, the average particle diameter may refer to the diameter (D50) of particles having a cumulative volume of 50 volume % in the particle size distribution. For example, the average particle diameter may be, for example, a median diameter (D50) measured utilizing a laser diffraction particle diameter distribution meter.

Also, as used herein, the singular forms "a", "an" and "the" are intended to include the plural forms as well, unless the context clearly indicates otherwise.

In the present inventive concepts, the term "or" is not to be construed as an exclusive meaning, and for example, "A or B" is construed to include A, B, A+B, and/or the like.

As used herein, "at least one of A, B, or C," "one of A, B, C, or any combination thereof" and "one of A, B, C, and any combination thereof" refer to each constituent element, and any combination thereof (e.g., A; B; C; A and B; A and C; B and C; or A, B, and C).

It will be understood that elements and/or properties thereof (e.g., structures, surfaces, directions, or the like), which may be referred to as being "perpendicular," "parallel," "coplanar," or the like with regard to other elements and/or properties thereof (e.g., structures, surfaces, directions, or the like) may be "perpendicular," "parallel," "coplanar," or the like or may be "substantially perpendicular," "substantially parallel," "substantially coplanar," respectively, with regard to the other elements and/or properties thereof.

Elements and/or properties thereof (e.g., structures, surfaces, directions, or the like) that are "substantially perpendicular" with regard to other elements and/or properties thereof will be understood to be "perpendicular" with regard to the other elements and/or properties thereof within manufacturing tolerances and/or material tolerances and/or have a deviation in magnitude and/or angle from "perpendicular," or the like with regard to the other elements and/or properties thereof that is equal to or less than 10% (e.g., a. tolerance of ±10%). Elements and/or properties thereof (e.g., structures, surfaces, directions, or the like) that are "substantially parallel" with regard to other elements and/or properties thereof will be understood to be "parallel" with regard to the other elements and/or properties thereof within manufacturing tolerances and/or material tolerances and/or have a deviation in magnitude and/or angle from "parallel," or the like with regard to the other elements and/or properties thereof that is equal to or less than 10% (e.g., a. tolerance of ±10%).

Elements and/or properties thereof (e.g., structures, surfaces, directions, or the like) that are "substantially coplanar" with regard to other elements and/or properties thereof will be understood to be "coplanar" with regard to the other elements and/or properties thereof within manufacturing tolerances and/or material tolerances and/or have a deviation in magnitude and/or angle from "coplanar," or the like with regard to the other elements and/or properties thereof that is equal to or less than 10% (e.g., a. tolerance of ±10%).

It will be understood that elements and/or properties thereof may be recited herein as being "the same" or "equal" as other elements, and it will be further understood that elements and/or properties thereof recited herein as being "identical" to, "the same" as, or "equal" to other elements may be "identical" to, "the same" as, or "equal" to or "substantially identical" to, "substantially the same" as or "substantially equal" to the other elements and/or properties thereof.

Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to and/or the same or substantially the same as other elements and/or properties thereof may be structurally the same or substantially the same, functionally the same or substantially the same, and/or compositionally the same or substantially the same.

It will be understood that elements and/or properties thereof described herein as being the "substantially" the same and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., ±10%) around the stated elements and/or properties thereof. While the term "same," "equal" or "identical" may be used in description of some example embodiments, it should be understood that some imprecisions may exist. Thus, when one element is referred to as being the same as another element, it should be understood that an element or a value is the same as another element or value within a desired manufacturing or operational tolerance range (e.g., ±10%).

When the term "about" is used in this specification in connection with a numerical value, it is intended that the associated numerical value includes a manufacturing or operational tolerance (e.g., ±10%) around the stated numerical value. Further, regardless of whether numerical values or shapes are modified as "about" or "substantially," it will be understood that these values and shapes should be construed as including a manufacturing or operational tolerance (e.g., ±10%) around the stated numerical values or shapes. When ranges are specified, the range includes all values therebetween such as increments of 0.1%.

Hereinafter, a composite abrasive according to some example embodiments will be described with reference to FIG. 1.

FIG. 1 is a schematic view of a composite abrasive according to some example embodiments.

A composite abrasive 1 according to some example embodiments includes a host material 3 having a two-dimensional planar structure and/or a layered structure and abrasive particles 5 protruding from the surface 3*s* of the host material 3, wherein the host material 3 has a Mohs hardness smaller than that of the abrasive particles 5 (e.g., the host material 3 has a Mohs hardness smaller than a Mohs hardness of the abrasive particles 5).

Although FIG. 1 shows abrasive particles 5 protruding upward from the host material 3, the abrasive particles 5 may also protrude downward from the host material 3 or both directions of the host material 3.

The host material 3 may have a Mohs hardness of less than or equal to about 5 and the abrasive particles 5 may have a Mohs hardness of greater than about 5.

The host material 3 may have a Mohs hardness of less than or equal to about 4.9, less than or equal to about 4.8, less than or equal to about 4.7, less than or equal to about 4.6, less than or equal to about 4.5, less than or equal to about 4.4, less than or equal to about 4.3, less than or equal to about 4.2, less than or equal to about 4.1, less than or equal to about 4.0, less than or equal to about 3.9, less than or equal to about 3.8, less than or equal to about 3.7, less than or equal to about 3.6, less than or equal to about 3.5, less than or equal to about 3.4, less than or equal to about 3.3, less than or equal to about 3.2, less than or equal to about 3.1, less than or equal to about 3.0, or less than or equal to about 2.5 and greater than or equal to about 0.1, greater than or equal to about 0.2, greater than or equal to about 0.3, greater than or equal to about 0.4, or greater than or equal to about 0.5. In addition, the abrasive particles 5 may have a Mohs hardness of greater than or equal to about 5.5, greater than or equal to about 5.6, greater than or equal to about 5.7, greater than or equal to about 5.8, greater than or equal to about 5.9, greater than or equal to about 6.0, greater than or equal to about 6.1, greater than or equal to about 6.2, greater than or equal to about 6.3, greater than or equal to about 6.4, greater than or equal to about 6.5, or greater than or equal to about 7.0 and less than or equal to about 10. The host material 3 and the abrasive particles 5 are configured to have respective Mohs hardness as above, and thereby the polishing rate and polishing efficiency may be improved while reducing or minimizing structural damage (e.g., surface scratches) and shape deformation of the structure being polished using the composite abrasive, based at least in part upon the respective Mohs harnesses of the host material 3 and the abrasive particles 5, particularly the host material 3 having a Mohs hardness (which may be less than or equal to about 5) that is smaller than a Mohs hardness of the abrasive particles 5 (which may be greater than about 5). As a result, a high-performance, highly integrated semiconductor device including a structure having a fine pitch of about 10 nm or less with reduced, minimized, or absence of defects may be manufactured based on one or more surfaces of the semiconductor device being polished using the composite abrasive 1 including the host material 3 and the abrasive particles 5 that are configured to have respective Mohs hardness as above.

The difference in Mohs hardness between the host material 3 and the abrasive particles 5 may be greater than or equal to about 4, greater than or equal to about 4.5, greater than or equal to about 5.0, greater than or equal to about 5.5, or greater than or equal to about 6.0. The difference in Mohs hardness between the host material 3 and the abrasive particles 5 may be less than or equal to about 1000, less than or equal to about 100, less than or equal to about 10, less than or equal to about 9.0, less than or equal to about 8.0, or less than or equal to about 7.0. In some example embodiments, the host material 3 serves as a support and the abrasive particles 5 may sufficiently serve as an abrasive.

The binding force between the host material 3 and the abrasive particles 5 may be greater than or equal to about 200 nN, greater than or equal to about 300 nN, about 400 nN, greater than or equal to about 500 nN, greater than or equal to about 600 nN, greater than or equal to about 700 nN, greater than or equal to about 800 nN, greater than or equal to about 900 nN, or greater than or equal to about 1000 nN. When the binding force is within the above range, the abrasive particles 5 may be prevented from falling off (e.g., separation from the host material 3, separating from the remainder of the composite abrasive 1, etc.) during the polishing process, or the likelihood of such "falling off" may be reduced or minimized. As a result, the performance of the composite abrasive 1 in facilitating polishing of a surface, with reduced, minimized, or prevented damage to the surface being polished due to separation of abrasive particles from the composite abrasive 1 during the polishing, may be enabled based on the binding force between the host material 3 and the abrasive particles 5 being greater than or equal to about 200 nN.

The binding force between the host material 3 and the abrasive particles 5 may be obtained by bringing probes at the tip of a cantilever of AFM (Atomic Force Microscopy) close to the surface of the composite abrasive 1 and detecting a degree of bending of the cantilever due to an atomic force between the probe and the composite abrasive 1.

The host material 3 may have a two-dimensional planar structure and/or a layered structure, and an aspect ratio (a ratio of the longest length to the height of a plane of the host material) of the host material 3 may be greater than or equal to about 3:1, greater than or equal to about 3.5:1, greater than or equal to about 4:1, greater than or equal to about 4.5:1, greater than or equal to about 5:1, greater than or equal to about 5.5:1, greater than or equal to about 6.0:1, greater than or equal to about 6.5:1, greater than or equal to about 7.0:1, greater than or equal to about 7.5:1, greater than or equal to about 8.0:1, greater than or equal to about 8.5:1, greater than or equal to about 9.0:1, greater than or equal to about 9.5:1, or greater than or equal to about 10:1 and less than or equal to about 1000:1, less than or equal to about 950:1, less than or equal to about 900:1, less than or equal to about 850:1, less than or equal to about 800:1, less than or equal to about 750:1, less than or equal to about 700:1, less than or equal to about 650:1, less than or equal to about 600:1, less than or equal to about 550:1, less than or equal to about 500:1, less than or equal to about 450:1, less than or equal to about 400:1, less than or equal to about 350:1, less than or equal to about 300:1, less than or equal to about 250:1, less than or equal to about 200:1, less than or equal to about 150:1, or less than or equal to about 100:1. When the aspect ratio is in the above range, the host material 3 may implement a two-dimensional planar structure and/or a layered planar structure, and is suitable for loading a plurality of abrasive particles 5.

The host material 3 may have a size of about 50 nm to about 100 μm. Here, "size" means a diameter when the plane shape is circular, and means a length of the longest part when it is not circular. The host material 3 may have a size of greater than or equal to about 50 nm, greater than or equal to about 60 nm, greater than or equal to about 70 nm, greater than or equal to about 80 nm, greater than or equal to about 90 nm, greater than or equal to about 100 nm, greater than or equal to about 110 nm, or greater than or equal to about 120 nm. In addition, the host material 3 may have a size of less than or equal to about 90 μm, less than or equal to about 80 μm, less than or equal to about 70 μm, less than or equal to about 60 μm, or less than or equal to about 50 μm. Within the above ranges, the host material 3 may sufficiently serve as a support for the abrasive particles 5.

The host material 3 may have an anisotropic structure. When the host material 3 has an anisotropic structure, a high polishing rate (Material Removal Rate (MRR)) may be obtained by increasing a contact area between the composite abrasive 1 and the object to be polished, and thus the composite abrasive 1 may enable improved polishing of the object.

The host material 3 may be an inorganic material. The inorganic material may be desirable for forming a two-dimensional planar structure and/or layered structure compared to organic materials (e.g., polymers), and are advantageous for securing a certain binding force capable of preventing the abrasive particles 5 from being separated in the polishing process, or reducing or minimizing the risk of such separation, thereby, and thus the composite abrasive 1 may enable improved polishing of the object with reduced, minimized, or prevented risk of damage to the object being polished due to separated abrasive particles 5.

The host material 3 may include graphite, graphene, graphene oxide, hexagonal boron nitride (h-BN), or any combination thereof.

The graphite may be plate-shaped or flake-shaped graphite, and may be natural graphite or artificial graphite.

The graphene may be prepared by a mechanical method or a chemical method, but example embodiments of methods for preparing the graphene are not limited thereto. The mechanical method may use an adhesive tape to obtain a thin graphene sheet. In some example embodiments, when the adhesive tapes are attached to both sides of the graphite particles and spread on both sides, the graphite is split in half, and this process is repeated to obtain graphene with a thin thickness. In the case of the chemical method, the graphene preparing method includes forming a substrate on which a graphitization catalyst (e.g., a metal catalyst such as Ni, Co, Fe, or Pt) is formed on at least one surface; contacting a carbon-based material (e.g., a carbon-containing polymer) as a carbon source on the substrate; and forming graphene on the graphitization catalyst by heat treatment under an inert atmosphere or a reducing atmosphere to obtain a graphene sheet on a substrate.

The graphene or graphene oxide may be formed by stacking a plurality of sheets of 2 or more, 3 or more, 4 or more, or 5 or more and 100 or less, 90 or less, 80 or less, 70 or less, 60 or less, or 50 or less, as long as the graphene or graphene oxide can provide a host material of a certain thickness, and the number (e.g., quantity) of layers is not particularly limited.

The hexagonal boron nitride may be a soft boron nitride having a plate-like structure. The hexagonal boron nitride may further include a boron oxide layer on a surface.

The host material 3 may have a shape suitable for having a two-dimensional planar structure and/or a layered structure, and may have any form such as a wrinkled form, a ribbon form, a bent form, a folded form, a tube form, etc. to the extent that a two-dimensional planar structure is maintained rather than a three-dimensional form of a three-dimensional structure (for example, a sphere). In addition, the shape of the upper surface of the host material 3 may be circular, elliptical, or polygonal, but is not limited thereto. A two-dimensional planar structure may include a single layer of the host material which may extend along a two-dimensional plane.

The layered structure may mean a structure in which two or more planar structures are laminated at regular intervals such that the two or more planar structures are stacked and thus overlap each other in a thickness direction of the layered structure and the two or more planar structures extend in parallel with each other in a direction perpendicular to the thickness direction. If a two-dimensional planar structure with a constant thickness can be formed, the number (e.g., quantity) of layers may be 2 or more, 3 or more, 4 or more, or 5 or more, and 100 or less, 90 or less, 80 or less, 70 or less, 60 or less, or 50 or less, but is not particularly limited.

The abrasive particles 5 may be loaded on (e.g., located at) the surface 3*s* of the host material 3 in a protruding form, such that the abrasive particles 5 protrude from the surface 3*s* of the host material 3 and thus protrude away from the host material 3 into an external environment that is external to the composite abrasive 1. A plurality of abrasive particles 5 exist on the surface 3*s* of the host material 3 and are supported by the host material 3 and are arranged in a certain direction to increase the polishing rate and polishing efficiency of the composite abrasive 1. That is, by being supported on the host material 3 having the two-dimensional planar structure and/or the layered structure, a plurality of abrasive particles 5 may be arranged (e.g., oriented) in substantially the same direction. The plurality of abrasive particles 5 may be arranged (e.g., oriented) in a direction perpendicular or substantially perpendicular to the surface 3*s* of the host material 3 having the two-dimensional planar structure and/or the layered structure. Herein, the perpendicular or substantially perpendicular direction may refer to a case where the abrasive particles 5 are arranged at an angle in the range of about 90 degrees±15 degrees with respect to the surface 3*s* of the host material 3 having the two-dimensional planar structure and/or the layered structure.

The abrasive particles 5 may include oxide, nitride, fluoride, carbide, or any combination thereof. The oxide may include silicon oxide, cerium oxide, titanium oxide, zirconium oxide, aluminum oxide, molybdenum oxide, ruthenium oxide, tantalum oxide, tungsten oxide, or any combination thereof; the nitride may include silicon nitride, aluminum nitride, titanium nitride, boron nitride (cubic structure), or any combination thereof; the fluoride is calcium fluoride ($CaF_2$), selenium fluoride ($SeF_4$), tellurium fluoride ($TeF_4$), or any combination thereof, and the carbide may include tantalum carbide, boron carbide, or any combination thereof.

The abrasive particles 5 may have a size (e.g., average particle diameter in the case of a sphere and the length of the longest portion in the case of a non-spherical shape) of less than or equal to about 100 nm, less than or equal to about 90 nm, less than or equal to about 80 nm, less than or equal to about 70 nm, less than or equal to about 60 nm, less than or equal to about 50 nm, less than or equal to about 40 nm, less than or equal to about 30 nm, or less than or equal to about 20 nm. The abrasive particles 5 may have a size (e.g., average particle diameter in the case of a sphere and the length of the longest portion in the case of a non-spherical shape) of greater than or equal to about 0.01 nm, greater than or equal to about 0.1 nm, greater than or equal to about 1 nm, greater than or equal to about 2 nm, greater than or equal to about 4 nm, greater than or equal to about 5 nm, or greater than or equal to about 8. The abrasive particles 5 may improve a polishing rate and polishing efficiency of the composite abrasive 1 by having the above-described sizes, and may be loaded in the host material 3 to reduce or minimize damage (e.g., surface scratches) to a fine pitch structure having a width of about 10 nm or less that is polished by the composite abrasive 1.

The abrasive particles 5 may be included in the composite abrasive 1 in an amount of greater than or equal to about 0.01 wt %, greater than or equal to about 0.02 wt %, greater than or equal to about 0.03 wt %, greater than or equal to about 0.04 wt %, greater than or equal to about 0.05 wt %, greater than or equal to about 0.06 wt %, greater than or equal to about 0.07 wt %, greater than or equal to about 0.08 wt %, greater than or equal to about 0.09 wt %, greater than or equal to about 0.1 wt %, greater than or equal to about 0.15 wt %, greater than or equal to about 0.2 wt %, greater than or equal to about 0.4 wt %, greater than or equal to about 0.5 wt %, or greater than or equal to about 1 wt % based on a total amount of the composite abrasive 1. In addition, the abrasive particles 5 may be included in the composite abrasive 1 in an amount of less than or equal to about 10 wt %, less than or equal to about 9 wt %, less than or equal to about 8 wt %, less than or equal to about 7 wt %, less than or equal to about 6 wt %, or less than or equal to about 5 wt % based on a total amount of the composite abrasive 1. Within the above ranges, the composite abrasive 1 may be effectively applied to a structure (e.g., to polish the structure) having a fine pitch having a width of about 10 nm or less while reducing or minimizing damage to the structure, and the polishing rate and polishing efficiency of the composite abrasive 1 may be improved.

According to some example embodiments, a composite abrasive includes a host material and abrasive particles protruding from the surface of the host material, wherein a binding force between the host material and the abrasive particles is greater than or equal to about 200 nN. The host material may have a two-dimensional planar structure and/or a layered structure.

Details of the host material and the abrasive particles are as described for the composite abrasive 1.

According to some example embodiments, a method of preparing a composite abrasive includes dissolving a precursor of abrasive particles in a solvent to prepare a solution dispersing a host material having a two-dimensional planar structure and/or layered structure in the solution followed by heat treatment (e.g., followed by performing a heat treatment of the host material dispersed in the solution to obtain the composite abrasive).

In some example embodiments, the composite abrasive may be prepared as follows: a dispersion is prepared by dispersing a host material in water, a precursor of abrasive particles is dissolved in a solvent to prepare a solution, the dispersion and the solution are mixed, and then a heat treatment is performed (e.g., the heat treatment is performed on the mixture of the dispersion and the solution).

The precursor of the abrasive particles may be a metal salt, a hydrate thereof, or any combination thereof, and the metal salt may include, for example, a metal-containing carboxylate, a metal-containing halide, a metal-containing nitrate, a metal-containing oxalate, a metal-containing alkoxide, or any combination thereof. When the metal is cerium, the metal salt may include, for example, cerium acetate hydrate, cerium (III) chloride heptahydrate, cerium (III) nitrate hexahydrate, cerium (III) oxalate hydrate, ammonium cerium (IV) nitrate, cerium (IV) isopropoxide, and the like.

The solution of the precursor of the abrasive particles may further include a reducing agent. The reducing agent may be an amine compound, and specific examples may include trialkylamines such as trimethylamine and triethylamine, or triarylamines such as triphenylamine. The alkyl may be C1 to C10 alkyl, and the aryl may be C6 to C10 aryl. The reducing agent may reduce the precursor of the abrasive particles to produce the abrasive particles, and may be used in an amount of about 1 mole to about 10 moles based on 1 mole of the precursor of the abrasive particles.

The heat treatment may be performed (e.g., performed on the mixture of the host material and the solution) at about 60° C. to about 800° C. The heat treatment temperature may be differently controlled depending on the host material and the precursor of the abrasive particles. In some example embodiments, the heat treatment may be performed at a temperature of greater than or equal to about 70° C., greater than or equal to about 80° C., greater than or equal to about 90° C., or greater than or equal to about 100° C., and less than or equal to about 790° C., less than or equal to about 780° C., less than or equal to about 770° C., less than or equal to about 760° C., or less than or equal to about 750° C.

According to some example embodiments, a polishing slurry including the aforementioned composite abrasive is provided.

The composite abrasive may be included in the polishing slurry in about 0.01 wt % to 10 wt % based on a total amount of the polishing slurry. The composite abrasive may be included in an amount of greater than or equal to about 0.01 wt %, greater than or equal to about 0.02 wt %, greater than or equal to about 0.03 wt %, greater than or equal to about 0.04 wt %, greater than or equal to about 0.05 wt %, greater than or equal to about 0.06 wt %, greater than or equal to about 0.07 wt %, greater than or equal to about 0.08 wt %, greater than or equal to about 0.09 wt %, greater than or equal to about 0.1 wt %, greater than or equal to about 0.15 wt %, greater than or equal to about 0.2 wt %, greater than or equal to about 0.4 wt %, greater than or equal to about 0.5 wt %, or greater than or equal to about 1 wt % based on a total amount of the polishing slurry. In addition, the composite abrasive may be included in the polishing slurry in an amount of less than or equal to about 10 wt %, less than or equal to about 9 wt %, less than or equal to about 8 wt %, less than or equal to about 7 wt %, less than or equal to about 6 wt %, or less than or equal to about 5 wt % based on a total amount of the polishing slurry. A desired polishing rate and polishing efficiency of the polishing slurry may be obtained within the above range.

The polishing slurry may include a plurality of composite abrasives that include respective host materials, wherein the separate host material of each separate composite abrasive may have a uniform thickness and the respective host materials of the plurality of composite abrasives may have a thickness variation (e.g., a variation between respective thicknesses of the respective host materials of the plurality of composite abrasives) of less than or equal to about 100 nm, for example less than or equal to about 90 nm, less than or equal to about 80 nm, less than or equal to about 70 nm, less than or equal to about 60 nm, less than or equal to about 50 nm, less than or equal to about 40 nm, less than or equal to about 30 nm, less than or equal to about 20 nm, or less than or equal to about 10 nm. The thickness variation may be greater than or equal to 0 nm, greater than or equal to about 0.01 nm, greater than or equal to about 0.1 nm, greater than or equal to about 1.0 nm, or greater than or equal to about 2.0 nm. When the thickness variation is within the above ranges, the distribution of the composite abrasive in the polishing slurry may be uniformly controlled.

In the polishing slurry, the composite abrasive may have a two-dimensional planar structure and/or a layered structure of the host material (e.g., a layered structure of two or more two-dimensional planar structures of the host material arranged to extend parallel to each other and stacked to overlap each other in a thickness direction of the composite abrasive).

The polishing slurry may further include an additive, and the additive may be, for example, a chelating agent, an oxidizing agent, a surfactant, a dispersant, a pH adjusting agent, or any combination thereof, but is not limited thereto.

The chelating agent may be, for example, phosphoric acid, nitric acid, citric acid, malonic acid, a salt thereof, or any combination thereof, but is not limited thereto.

The oxidizing agent may be, for example, hydrogen peroxide, hydrogen peroxide water, sodium hydroxide, potassium hydroxide, or any combination thereof, but is not limited thereto.

The surfactant may be an ionic or nonionic surfactant, and may be, for example, a copolymer of ethylene oxide, a copolymer of propylene oxide, an amine compound, or any combination thereof, but is not limited thereto.

The dispersant may promote dispersion of the composite abrasive, and may include, for example, a water-soluble monomer, a water-soluble oligomer, a water-soluble polymer, a metal salt, or any combination thereof. A weight average molecular weight of the water-soluble polymer may be, for example, less than or equal to about 10,000, for example less than or equal to about 5000, for example less than or equal to about 3000, for example greater than or equal to about 1, for example greater than or equal to about 10, for example greater than or equal to about 100, for example greater than or equal to about 1000. The metal salt may be, for example, a copper salt, a nickel salt, a cobalt salt, a manganese salt, a tantalum salt, a ruthenium salt, or any combination thereof. The dispersant may be, for example, poly(meth)acrylic acid, poly(meth)acrylic-co-maleic acid, polyacrylonitrile-co-butadiene-co-acrylic acid, carboxylic acid, sulfonic ester, sulfonic acid, phosphoric ester, cellulose, diol, a salt thereof, or a combination thereof, but is not limited thereto.

The pH adjusting agent may adjust the pH of the polishing slurry, and may be, for example, an inorganic acid, an organic acid, a salt thereof, or any combination thereof. The inorganic acid or a salt thereof may include, for example, nitric acid, hydrochloric acid, phosphoric acid, sulfuric acid, hydrofluoric acid, hydrobromic acid, hydroiodic acid, or a salt thereof, and the organic acid or a salt thereof may include, for example, formic acid, malonic acid, maleic acid, oxalic acid, adipic acid, citric acid, acetic acid, propionic acid, fumaric acid, lactic acid, salicylic acid, benzoic acid, succinic acid, phthalic acid, butyric acid, glutaric acid, glutamic acid, glycolic acid, aspartic acid, tartaric acid, or a salt thereof, but is not limited thereto.

Each additive may be independently included in a small amount of, for example, about 1 ppm to about 100,000 ppm, but is not limited thereto.

The polishing slurry may further contain a solvent capable of dissolving or dispersing the above components, and the solvent may be, for example, water. The water may be, for example, distilled and/or deionized water.

The aforementioned polishing slurry may be applied when forming various structures, and may be applied, for example, to a process of polishing a conductor such as a metal wire or a process of polishing an insulator such as shallow trench isolation (STI) or an insulating layer. For example, the polishing slurry may be used to polish a conductor such as a metal wire in a semiconductor substrate, and may be used to polish a conductor such as copper (Cu), tungsten (W), or an alloy thereof.

Hereinafter, a method for manufacturing a semiconductor device using the aforementioned polishing slurry according to some example embodiments will be described.

Figure 13:
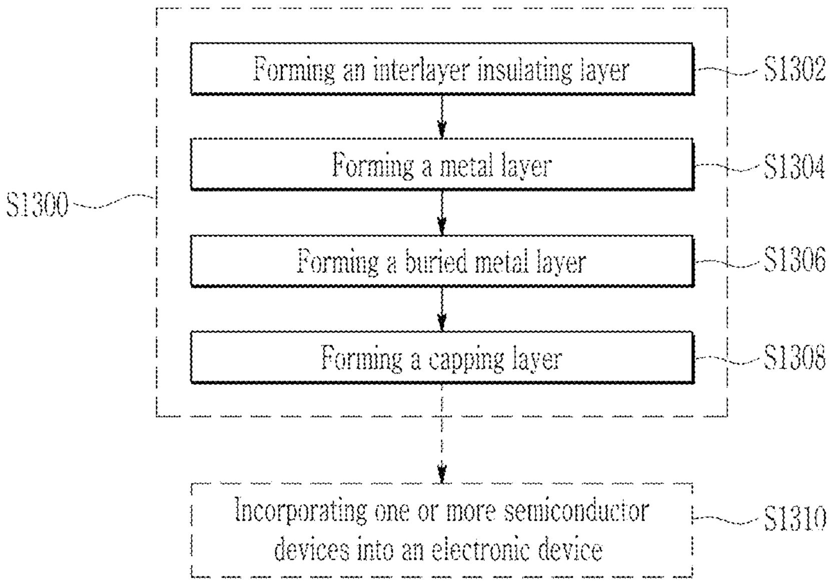
FIG. 13 is a flowchart showing a method according to some example embodiments.

FIGS. 2 to 5 are cross-sectional views illustrating a method of manufacturing a semiconductor device according to some example embodiments. FIG. 13 is a flowchart showing a method according to some example embodiments that includes a method S1300 of manufacturing a semiconductor device as shown in at least FIGS. 2 to 5.

Figure 2:
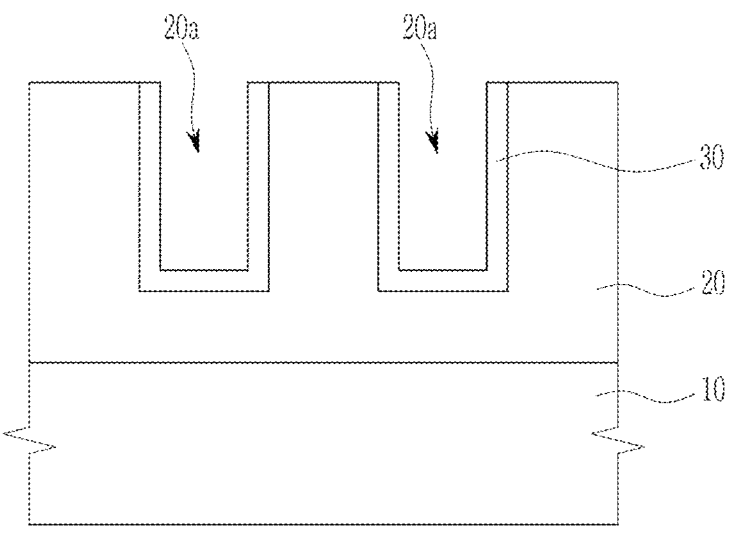
FIGS. 2, 3, 4, and 5 are cross-sectional views illustrating a method of manufacturing a semiconductor device according to some example embodiments.

Referring to FIG. 2 and FIG. 13, at S1302 an interlayer insulating layer 20 is formed on a semiconductor substrate 10 (e.g., a silicon substrate). The interlayer insulating layer 20 may include oxide, nitride, and/or oxynitride. The interlayer insulating layer 20 may include an inorganic insulating material such as silicon oxide and/or silicon nitride or a low dielectric constant (low K) material such as SiC, SiCOH, SiCO, and SiOF. Examples of the oxide may include titanium oxide, silicon oxide, zirconium oxide, and the like. Subsequently, the interlayer insulating layer 20 is etched to form a trench 20*a*. The trench 20*a* may have a width of about 10 nm or less (e.g., a width of about 0.01 nm to about 10 nm, a width of about 0.1 nm to about 10 nm, a width of about 1.0 nm to about 10 nm, etc.). Then, a barrier layer 30 is formed on the wall surface of the trench. The barrier layer 30 may include, for example, Ta and/or TaN, but is not limited thereto.

Figure 3:
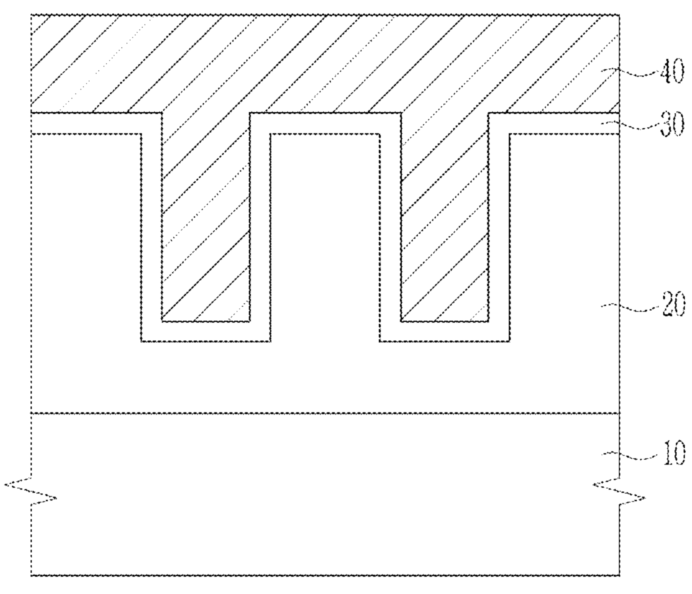

Referring to FIG. 3 and FIG. 13, at S1304 a metal layer 40 is formed by filling a metal such as copper (Cu) inside the trench.

Figure 4:
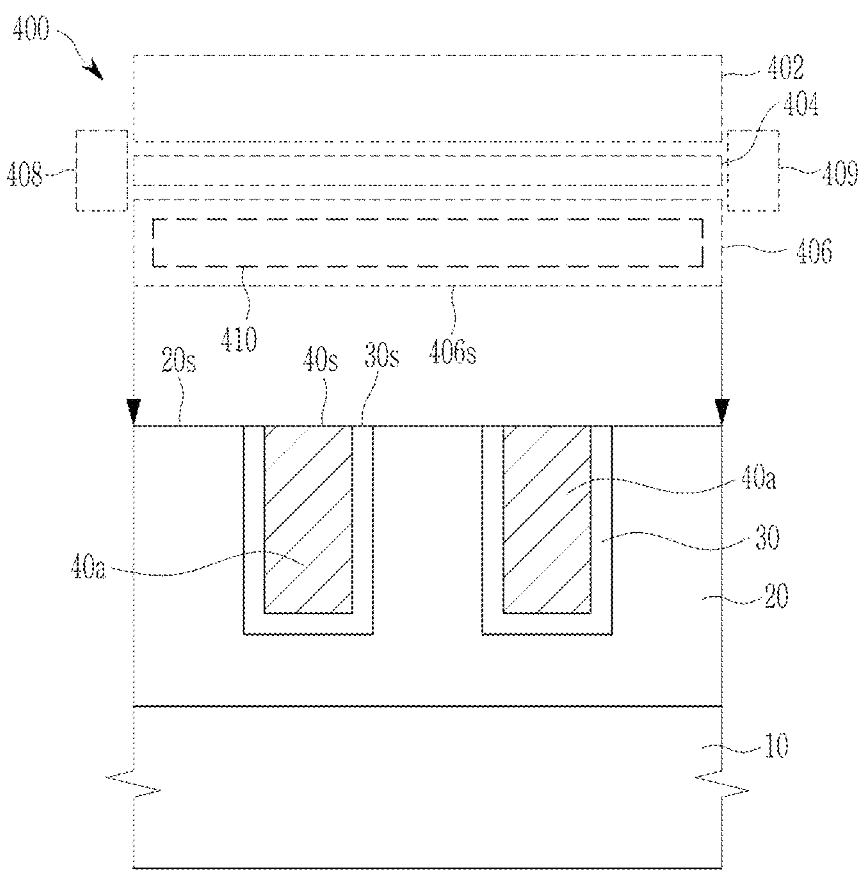

Referring to FIG. 4 and FIG. 13, at S1306 a buried metal layer 40*a* is formed by planarizing the surface 40*s* of the metal layer 40 to match (e.g., to be coplanar or substantially coplanar with) the surface 20*s* of the interlayer insulating layer 20. The planarization may further cause the surface 40*s* of the metal layer 40, the surface 30*s* of the barrier layer 30, and the surface 20*s* of the interlayer insulating layer 20 to be coplanar or substantially coplanar with each other. Each of surfaces 20*s*, 30*s*, and 40*s* may be exposed surfaces that are exposed to an exterior of the semiconductor device. The planarization may be performed with the chemical mechanical polishing using a chemical mechanical polishing (CMP) equipment 400 by using the aforementioned polishing slurry 410. This will be described later. For example, when the barrier layer 30 is a Ta layer, and the metal layer 40 is a Cu layer, the higher polishing selectivity of Ta to Cu of the polishing slurry, the better, for example, the higher than about 50:1, the better.

Figure 5:
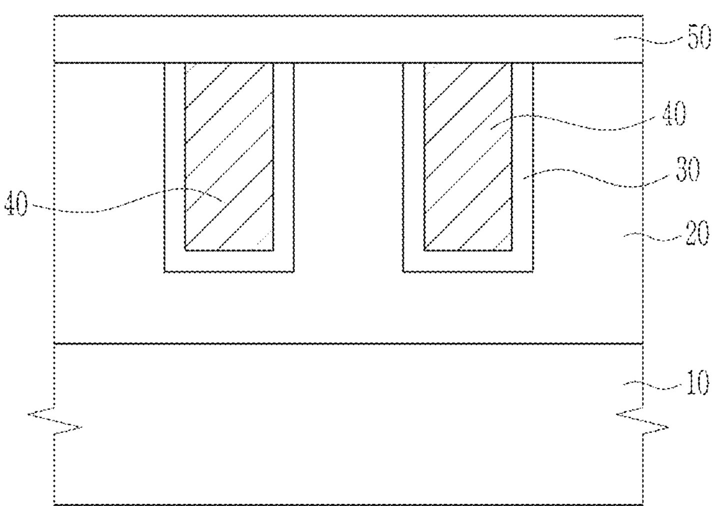

Referring to FIG. 5 and FIG. 13, at S1308 a capping layer 50 is formed on the buried metal layer 40 and the interlayer insulating layer 20. The capping layer 50 may include SiN and/or SiC but is not limited thereto.

Hereinafter, the planarization of the surface 40*s* of the metal layer 40 to match (e.g., to be coplanar or substantially coplanar with) at least the surface 20*s* of the interlayer insulating layer 20 to form the buried metal layer 40*a* is illustrated. Referring to FIG. 4, the planarization may be performed, as described above, by the chemical mechanical polishing using the chemical mechanical polishing (CMP) equipment 400.

The chemical mechanical polishing equipment 400 may include, for example, a lower base 402; a platen 404 rotatably provided on the upper surface of the lower base 402; a polishing pad 406 on the platen; a pad conditioner 408; and at least one polishing slurry supply device 409 disposed close to the polishing pad configured to supply the polishing slurry 410.

The platen 404 may be rotatably provided on the surface of the lower base 402. For example, the platen 404 may receive rotational power from a motor disposed in the lower base 402. Accordingly, the platen 404 may rotate around an imaginary rotation axis perpendicular to the surface of the platen 404. The imaginary rotation axis may be perpendicular to the surface of the lower base 402.

The platen 404 may include one or more supply lines through which a liquid may be injected and discharged. For example, water may be injected and discharged into the platen 404 through the supply lines to adjust a temperature of the platen 404. For example, cooling water may be injected and discharged into the platen 404 through the supply lines and thus, lower the temperature of the platen 404 which is overheated. For example, hot water at a high temperature may be injected and discharged into the platen 404 through the supply lines, leading to increasing the temperature of the platen 404.

A polishing pad 406 may be disposed on the surface of the platen 404 to be supported by the platen 404. The polishing pad 406 may be rotated with the platen 404. The polishing pad 406 may have a rough polishing surface 406*s*. This polishing surface 406*s* may directly contact the semiconductor substrate 10, the interlayer insulating layer 20, the barrier layer 30, the metal layer 40, or any combination thereof (e.g., one or more surfaces 20*s*, 30*s*, and 40*s* thereof) to mechanically polish a surface of the semiconductor substrate 10, the interlayer insulating layer 20, the barrier layer 30, the metal layer 40, or any combination thereof (e.g., surfaces 20*s*, 30*s*, and 40*s*). The polishing pad 406 may be a porous material having a plurality of microspaces, and the plurality of microspaces may hold the polishing slurry 410, for example such that the polishing slurry 410 is located within an interior of the polishing pad 406 and/or microspaces of the polishing pad 406 that are exposed to a polishing surface 406*s* of the polishing pad 406.

The pad conditioner 408 may be disposed close to the polishing pad 406 to maintain the polishing surface 406*s*, so that the surface of the semiconductor substrate 10, the interlayer insulating layer 20, the barrier layer 30, the metal layer 40, or any combination thereof (e.g., surfaces 20*s*, 30*s*, and 40*s*) may be effectively polished during the polishing process.

The polishing slurry supply device 409 may be disposed close to the polishing pad 406 and supply the polishing slurry 410 to the polishing pad 406.

The polishing slurry supply device 409 may include a nozzle capable of supplying the polishing slurry 410 on the polishing pad 406 during the polishing process and a voltage supply unit capable of applying a particular (or, alternatively, predetermined) voltage to the nozzle. The polishing slurry 410 in the nozzle may be charged by the voltage applied from the voltage supply unit. The polishing slurry supply device 409 may supply the aforementioned polishing slurry 410.

The chemical mechanical polishing may be, for example, performed by arranging a semiconductor substrate 10, an interlayer insulating layer 20, a barrier layer 30, a metal layer 40, or any combination thereof (e.g., surfaces 20*s*, 30*s*, and 40*s*) and a polishing pad 406 to face each other; supplying the aforementioned polishing slurry 410 from a polishing slurry supply device 409 between the semiconductor substrate 10, the interlayer insulating layer 20, the barrier layer 30, the metal layer 40, or any combination thereof and the polishing pad 406; and contacting the surface of the semiconductor substrate 10, the interlayer insulating layer 20, the barrier layer 30, the metal layer 40, or any combination thereof (e.g., surfaces 20*s*, 30*s*, and 40*s*) with the polishing pad 406 (e.g., the polishing surface 406*s* thereof) to perform polishing.

For example, the polishing slurry 410 may be supplied to the polishing pad 406 at a rate of, for example, about 10 ml/min to about 1000 ml/min.

The polishing may be performed by mechanical friction by bringing the surface of the semiconductor substrate 10, the interlayer insulating layer 20, the barrier layer 30, the metal layer 40, or any combination thereof (e.g., surfaces 20*s*, 30*s*, and 40*s*) into contact with the polishing pad 406 (e.g., the polishing surface 406*s* thereof) and rotating the polishing pad 406 in relation to the surface of the semiconductor substrate 10, the interlayer insulating layer 20, the barrier layer 30, the metal layer 40, or any combination thereof (e.g., surfaces 20*s*, 30*s*, and 40*s*). For example, a pressure of about 1 psi to about 100 psi may be applied between the polishing pad 406 and a surface of the semiconductor substrate 10, the interlayer insulating layer 20, the barrier layer 30, the metal layer 40, or any combination thereof (e.g., surfaces 20*s*, 30*s*, and 40*s*) in the step of performing polishing.

As described herein, a "semiconductor substrate" as described herein may include one or more structures of a semiconductor device, including for example one or more of the semiconductor substrate 10, the interlayer insulating layer 20, the barrier layer 30, and/or the metal layer 40. As described herein, a surface of a "semiconductor substrate" as described herein may include one or more surfaces of one or more structures of a semiconductor device, including for example one or more surfaces of one or more of the semiconductor substrate 10, the interlayer insulating layer 20, the barrier layer 30, and/or the metal layer 40 (e.g., one or more of surfaces 20*s*, 30*s*, and/or 40*s*).

As described herein, the step of performing polishing, performing polishing of the surface of a "semiconductor substrate," or the like may be understood to include performing a polishing of (e.g., as part of planarizing) one or more surfaces of a semiconductor device, including for example one or more of the surfaces 20*s*, 40*s*, and/or 30*s* of the interlayer insulating layer 20, the barrier layer 30, and/or the metal layer 40.

Although the method of manufacturing a semiconductor device according to some example embodiments has been described above, the method is not limited thereto and may be applied to semiconductor devices having various structures.

Figure 14:
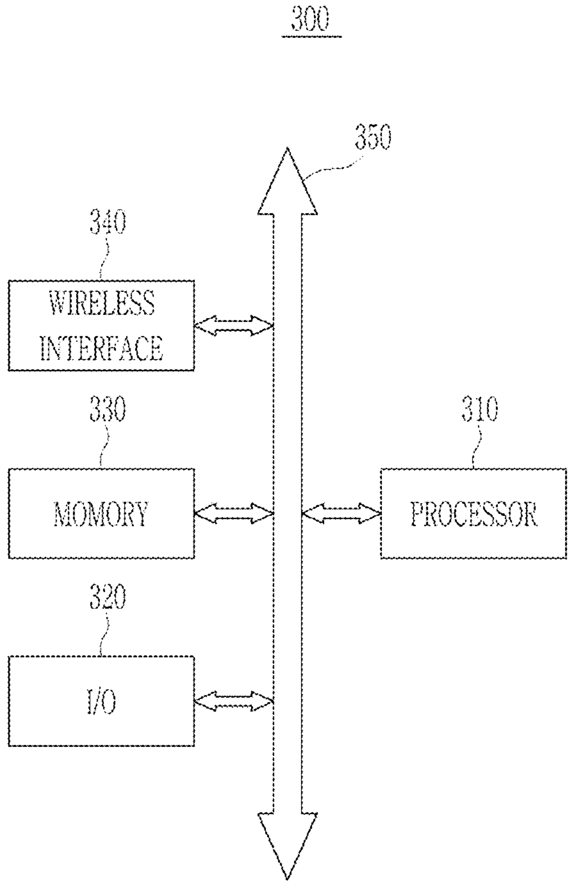
FIG. 14 is a schematic block diagram of an electronic device according to some example embodiments.

Still referring to FIG. 13, at S1310, one or more semiconductor devices manufactured at S1300 may be incorporated (e.g., applied) into the assembly of an electronic device, including for example an electronic device as shown in FIG. 14. For example.

As a result, an electronic device configured to have improved performance and integration (e.g., improved compactness) may be manufactured based on being manufactured to include one or more high-performance, highly integrated semiconductor device (e.g., having a structure having a fine pitch of about 10 nm or less) based on having structure surfaces polished using a polishing slurry that includes a composite abrasive according to any of the example embodiments.

FIG. 14 is a schematic block diagram of an electronic device 300 according to some example embodiments.

Referring to FIG. 14, an electronic device 300 may include a processor 310, an input/output device (I/O) 320, a memory device 330, and a wireless interface 340, which are respectively connected to one another through a bus 350. In some example embodiments, one or more of the input/output device 320 or the wireless interface 340 may be omitted from the electronic device 300. At least one of the processor 310, the input/output device 320, the memory device 330, or the wireless interface 340 may include one or more semiconductor devices manufactured according to any of the example embodiments (e.g., using a polishing slurry that includes the composite abrasive according to any of the example embodiments). In some example embodiments, the electronic device 300 may be configured to control various equipment for manufacturing a semiconductor device (including, for example, controlling some or all of the chemical mechanical polishing equipment 400) and/or various equipment for manufacturing an electronic device to cause the various equipment to manufacture a semiconductor device, an electronic device including same, or the like.

The processor 310 may include at least one of a microprocessor, a digital signal processor, or a processing device similar thereto. The input/output device 320 may include at least one of a keypad, a keyboard, or a display. The memory device 330 may include a non-transitory computer readable medium configured to store a program of instructions (e.g., a solid state drive memory device). The memory device 330 may be used to store commands executed by the processor 310. For example, the memory device 330 may be used to store user data. The electronic device 300 may use the wireless interface 340 to transmit/receive data over a wireless communication network. The wireless interface 340 may include an antenna and/or a wireless transceiver.

The electronic device 300 and/or any portion thereof (e.g., the processor 310, the memory device 330, the input/output device 320, the wireless interface 340, any portion thereof, or the like) may include, may be included in, and/or may be implemented by one or more instances of processing circuitry such as hardware including logic circuits; a hardware/software combination such as a processor executing software; or any combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a solid state drive (SSD) device, storing a program of instructions, and a processor (e.g., a CPU) configured to execute the program of instructions to implement the functionality and/or methods performed by some or all of the electronic device 300 and/or any equipment and/or methods implemented and/or controlled thereby (e.g., to perform some or all of the method shown in FIGS. 2-5 and 13).

Hereinafter, some example embodiments are illustrated in more detail with reference to examples. However, the scope of the inventive concepts is not limited to these examples.

Synthesis Example 1A: Preparation of Composite Abrasive 0.315 g of cerium (Ill) nitrate hexahydrate [($CeN_3O_9 \cdot 6H_2O$), CAS #: 10294-41-4, Sigma-Aldrich Co., Ltd.] is dissolved in 65 ml of ethanol. Subsequently, 5 ml of deionized water (DI water) is additionally added thereto. When the cerium (III) nitrate hexahydrate is completely dissolved, 0.5 g of hexagonal boron nitride ($D_{max}$<1 μm, Sigma-Aldrich Co., Ltd.) powder is added to this solution, and the obtained mixture is treated with an ultrasonic wave for 10 minutes. While the ultrasonicated mixture is vigorously stirred, 0.280 g of trimethylamine (Sigma-Aldrich Co., Ltd.) is dissolved in 10 ml of NMP (N-methyl-2-pyrrolidone), and a solution therefrom is added dropwise to the mixture at 1.0 ml/min with a syringe. When the addition is completed, the mixture is reacted at room temperature (about 24° C.) for 24 hours, while stirring at a constant speed. When the reaction is completed, the solution is three times washed with ethanol by using a centrifuge and dried in an 85° C. oven for 4 hours or more. After the drying, the obtained product is put in a furnace and calcined at 600° C. for 30 minutes to prepare a composite abrasive in which ceria having Mohs hardness of 7.5 to 8 is loaded on the surface of hexagonal boron nitride having Mohs hardness of 2 in a partially protruding form (e.g., the ceria at least partially protrudes from the surface of the hexagonal boron nitride).

Synthesis Example 1B: Preparation of Composite Abrasive

A composite abrasive is prepared in the same manner as in Synthesis Example 1A except that the content of ethanol dissolving 0.315 g of cerium (III) nitrate hexahydrate [($CeN_3O_9 \cdot 6H_2O$), CAS #: 10294-41-4, Sigma-Aldrich Co., Ltd.] is changed into 45 ml.

Synthesis Example 1C: Preparation of Composite Abrasive

A composite abrasive is prepared in the same manner as in Synthesis Example 1A except that the content of ethanol dissolving 0.315 g of cerium (III) nitrate hexahydrate [($CeN_3O_9 \cdot 6H_2O$), CAS #: 10294-41-4, Sigma-Aldrich Co., Ltd.] is changed into 35 ml.

Synthesis Example 1 D: Preparation of Composite Abrasive

A composite abrasive is prepared in the same manner as in Synthesis Example 1A except that the content of ethanol dissolving 0.315 g of cerium (III) nitrate hexahydrate [($CeN_3O_9 \cdot 6H_2O$), CAS #: 10294-41-4, Sigma-Aldrich Co., Ltd.] is changed into 15 ml.

Synthesis Example 2: Preparation of Composite Abrasive 0.319 g of ammonium cerium (IV) nitrate [$(NH_4)_2Ce(NO_3)_6$, CAS #: 16774-21-3, Sigma-Aldrich Co., Ltd.] is dissolved in 80 ml of a mixed solution of deionized (DI) water and ethanol (a volume ratio of 50/50). When completely dissolved, 0.5 g of graphite powder ($D_{max}$<20 μm, Sigma-Aldrich Co., Ltd.) is added to this solution and then, ultrasonicated for 10 minutes. After the ultrasonication, the ultrasonicated resultant is reacted for 18 hours. When the reaction is completed, the solution is three times washed with ethanol by using a centrifuge. The washed powder is dried at 85° C. for 3 hours or more in a furnace and heated up to 450° C. at 1° C./min and heat-treated at the temperature for 30 min, preparing a composite abrasive in which ceria having Mohs hardness of 7.5 to 8 is loaded on the surface of graphite having Mohs hardness of 1.5, in a partially protruding form (e.g., the ceria at least partially protrudes from the surface of the graphite).

Synthesis Example 3: Preparation of Composite Abrasive 1.4 mL of ammonia solution in ethanol is dissolved in 60 mL of ethanol. Subsequently, 5 mL of deionized water (DI water) is additionally added thereto. Then, 0.5 g of hexagonal boron nitride ($D_{max}$<1 μm, Sigma-Aldrich Co., Ltd.) powder is added to the solution, and the obtained mixture is treated with an ultrasonic wave for 10 minutes. While the ultrasonicated mixture is vigorously stirred, 0.16 ml of tetraethyl orthosilicate [($Si(OC_2H_5)_4$); TEOS, CAS #78-10-4, Sigma-Aldrich Co., Ltd] is dissolved in 10 mL of ethanol, and the solution is added dropwise to the mixture at 1.0 mL/min with a syringe pump. When the addition is completed, the mixture is reacted at room temperature for 24 hours, while string at a constant speed. When the reaction is completed, the solution is three times washed with ethanol by using a centrifuge and dried in an 85° C. oven for 4 hours or more. After the drying, the obtained product is put in a furnace and calcined at 600° C. for 30 minutes to prepare a composite abrasive in which silica having Mohs hardness of 6 to 7 is loaded on the surface of hexagonal boron nitride having Mohs hardness of 2 in a partially protruding form.

Preparation Examples: Preparation of Polishing Slurry

Preparation Examples 1A to 1D

Each composite abrasive according to Synthesis Examples 1A to 1D is added to water at a concentration of 1.0 wt % and then, stirred at pH 9, preparing polishing slurry according to Preparation Examples 1A to 1D.

Preparation Example 2

Polishing slurry according to Preparation Example 2 is prepared by adding the composite abrasive according to Synthesis Example 2 to water at a concentration of 1.0 wt % and then, stirring the mixture at pH 9.

Preparation Example 3

Polishing slurry according to Preparation Example 3 is prepared by adding the composite abrasive according to Synthesis Example 3 to water at a concentration of 1.0 wt % and then, stirring the mixture at pH 9.

Comparative Preparation Example 1

$CeO_2$ nanoparticles ($D_{50}$: about 25 nm) are dispersed in deionized (DI) water (pH 9), preparing polishing slurry.

Evaluation Example 1: Confirmation of Composite Abrasive

Figure 6:
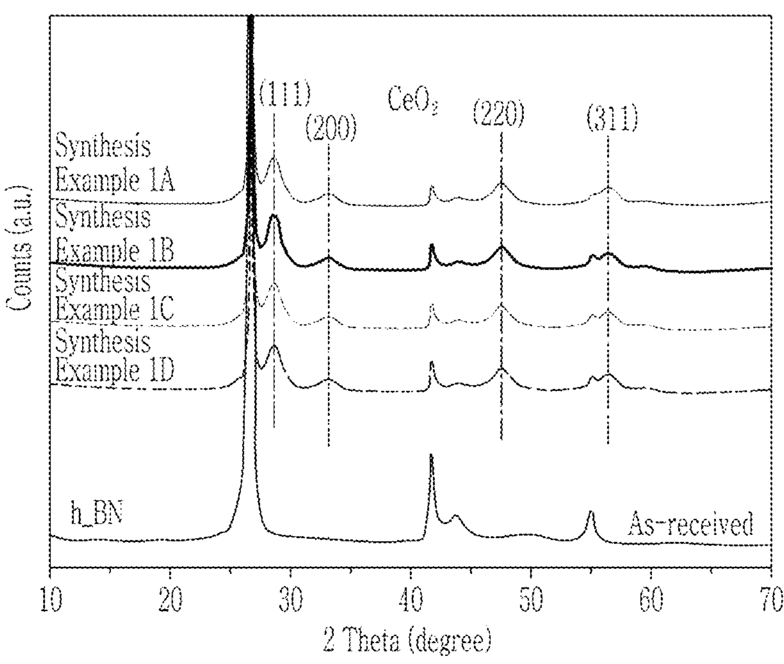
FIG. 6 is a view showing the results of X-ray diffraction analysis of composite abrasives according to Synthesis Examples 1A to 1D.
Figure 7:
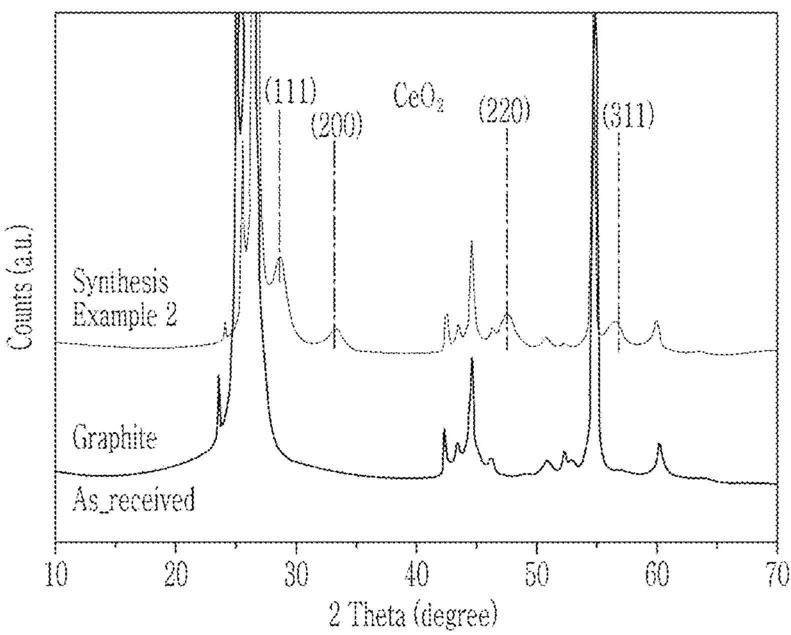
FIG. 7 is a view showing the results of X-ray diffraction analysis of the composite abrasive according to Synthesis Example 2.

The composite abrasives according to the synthesis examples are X-ray diffraction-analyzed, and the results are shown in FIGS. 6 and 7.

FIG. 6 is a view showing the X-ray diffraction analysis results of composite abrasives according to Synthesis Examples 1A to 1D, and FIG. 7 is a view showing the X-ray diffraction analysis results of the composite abrasive according to Synthesis Example 2. For comparison, FIG. 6 also shows an X-ray diffraction analysis result of boron nitride (h-BN) not loaded with ceria, and FIG. 7 shows an X-ray diffraction analysis result of graphite not loaded with ceria.

Referring to FIG. 6, the composite abrasives according to Synthesis Examples 1A to 1D maintain a peak at the same position as boron nitride and additionally exhibit another peak corresponding to ceria. Accordingly, the composite abrasives according to Synthesis Examples 1A to 1D turn out to be (e.g., comprise) an abrasive in which boron nitride and ceria are combined.

Referring to FIG. 7, the composite abrasive according to Synthesis Example 2 maintains a peak at the same position as graphite and exhibits another peak corresponding to ceria. Accordingly, the composite abrasive according to Synthesis Example 2 turns out to be (e.g., comprises) an abrasive in which graphite and ceria are combined.

Figure 8A:
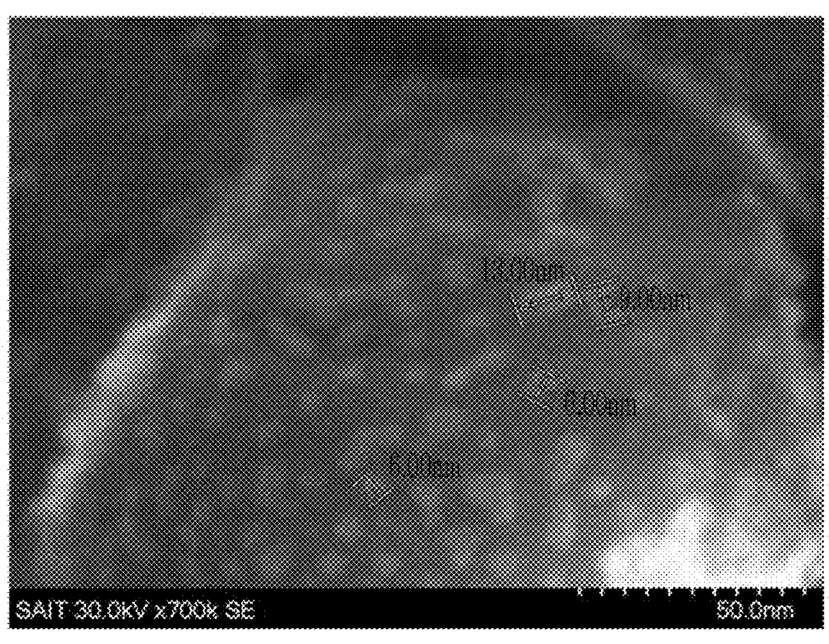
FIGS. 8A and 8B are scanning electron micrographs of the composite abrasive according to Synthesis Example 1A at different magnifications, respectively.
Figure 8B:
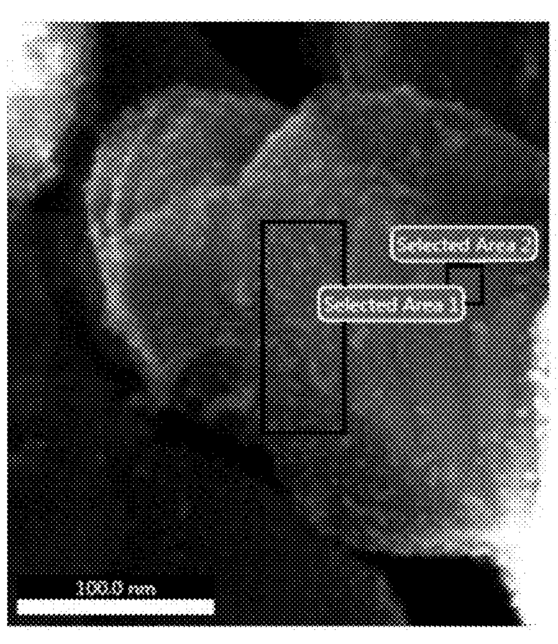

The composite abrasive according to Synthesis Example 1A is examined through a scanning electron microscopic image of the surface, which is shown in FIGS. 8A and 8B. FIGS. 8A and 8B are a scanning electron micrograph of the composite abrasive according to Synthesis Example 1A at different magnifications, respectively. Referring to FIGS. 8A and 8B, the composite abrasive according to Synthesis Example 1A exhibits nano-sized ceria particles formed on the surface.

Figure 9A:
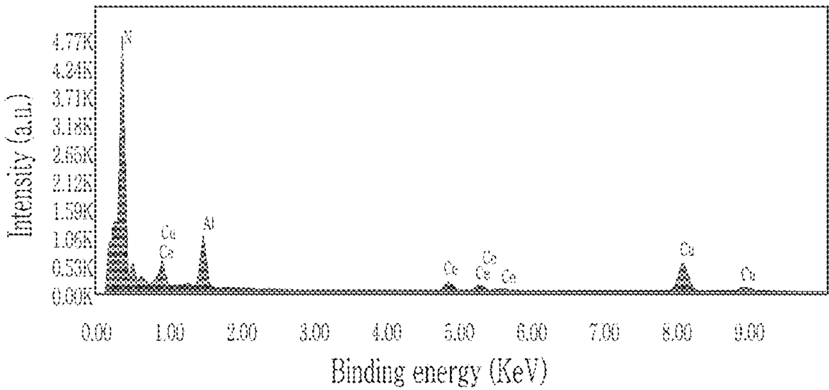
FIGS. 9A and 9B are graphs showing the results of energy dispersive X-ray spectroscopy (EDS) analysis of Area 1 and Area 2 of the composite abrasive according to Synthesis Example 1A shown in FIG. 8B, respectively.
Figure 9B:
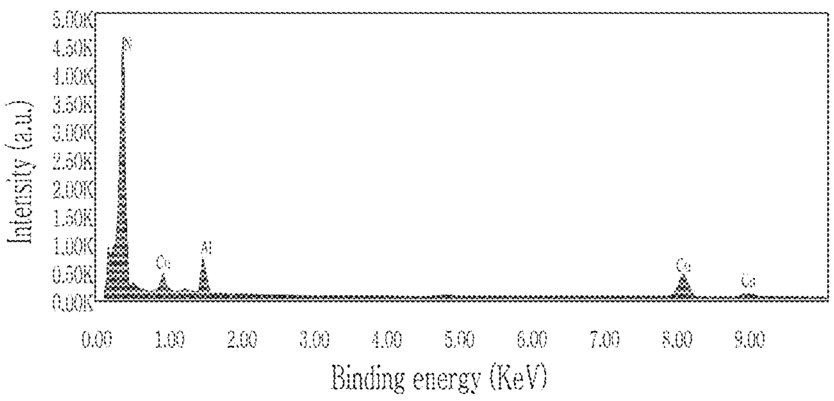

In the composite abrasive according to Synthesis Example 1A, FIGS. 9A and 9B exhibit energy dispersive X-ray spectroscopy (EDS) analysis results of Area 1 and Area 2 shown in FIG. 8B. FIGS. 9A and 9B are graphs showing the energy dispersive X-ray spectroscopy (EDS) analysis results of Area 1 and Area 2 of the composite abrasive according to Synthesis Example 1A shown in FIG. 8B, respectively. Referring to FIG. 9A, since Ce is detected, the composite abrasive turns out to include ceria, but referring to FIG. 9B, there is a region where ceria is not formed. Accordingly, the ceria is selectively formed in a particular (or, alternatively, predetermined) region. In FIGS. 9A and 9B, the peaks of Cu and Al are derived the sample holder during the EDS analysis.

Figure 10:
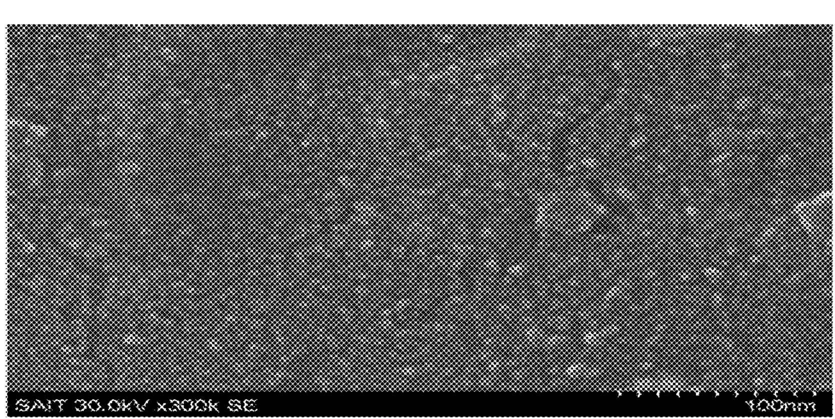
FIG. 10 is a scanning electron micrograph of the composite abrasive according to Synthesis Example 2.

The composite abrasive of Synthesis Example 2 is examined with respect to the surface through a scanning electron microscope photograph, which is shown in FIG. 10. FIG. 10 is a scanning electron micrograph of the composite abrasive according to Synthesis Example 2. Referring to FIG. 10, the composite abrasive of Synthesis Example 2 turns out to have nano-sized ceria particles formed on the surface.

Figure 11:
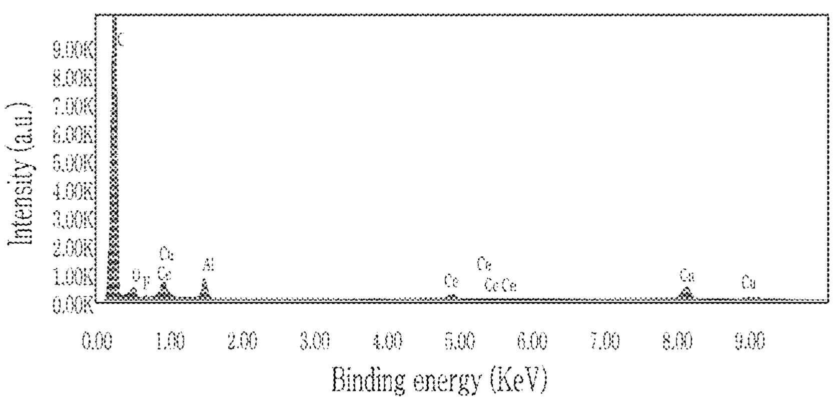
FIG. 11 is a graph showing the results of energy dispersive X-ray spectroscopy (EDS) analysis of the composite abrasive according to Synthesis Example 2.

Components of the composite abrasive according to Synthesis Example 2 are examined with EDS (energy dispersive X-ray spectroscopy), and the result is shown in FIG. 11. FIG. 11 is a graph showing the energy dispersive X-ray spectroscopy (EDS) analysis results of the composite abrasive according to Synthesis Example 2. Referring to FIG. 11, since Ce is detected, the composite abrasive turns out to include ceria.

Evaluation Example 2: Measurement of Polishing Rate (Material Removal Rate (MRR))

A silicon wafer having a diameter of 300 mm and coated with an oxide (tetraethyl orthosilicate (TEOS)) film is cut into a size of 40 mm×40 mm to prepare a substrate, which is used for evaluating a polishing rate. A thickness of the substrate before polishing is measured, and then, a thickness thereof after the polishing is measured again, which are used to obtain a thickness change (nm) per unit time (min) as a material removal rate (MRR). The thickness measurement is performed by 5 times measuring each thickness at the center of the substrate with a reflectometer (F20-UV, Filmetrics, Inc.) and then, calculating an average therefrom. The results of the polishing slurry of Preparation Example 1A are shown in Table 1.

The polishing is performed under the following conditions.

(1) CMP equipment: MA-200e (Musashino Denshi, Inc.)
(2) Polishing pad: IC1000 (Dow Chemical Co.)
(3) Number of polishing head rotation: 90 rpm
(4) Number of polishing platen rotation: 90 rpm
(5) Applied pressure: 3.5 psi
(6) Polishing slurry supply method: 100 ml of polishing slurry is placed on a polishing pad and polishing is performed

TABLE 1

| | MRR (nm/min) |
|---|---|
| Preparation Example 1A | 4.2 |

Referring to Table 1, the polishing slurry according to Preparation Example 1A exhibits an excellent polishing rate.

Evaluation Example 3: Measurement of Surface Damage

After the polishing, surface smoothness of a wafer is measured to evaluate surface damage thereof.

A silicon wafer coated with an oxide (tetraethyl orthosilicate (TEOS)) film and having a diameter of 300 mm is cut into a size of 40 mm×40 mm to obtain a substrate, which is used to evaluate the surface damage. RMS (root mean square, Rq) values of the substrate are measured in a tapping mode at three points in the center by using an AFM meter (Bruker Science Company), which are calculated into an average. When ceria particles are not completely removed, the values are measured by selecting a certain region having no ceria particles. The results of Preparation Example 1A and Comparative Preparation Example 1 are shown in Table 2.

TABLE 2

| | Surface smoothness (Rq, nm) |
|---|---|
| Preparation Example 1A | 0.140 |
| Comparative Preparation Example 1 (ref) | 0.244 |

Referring to Table 2, the polishing slurry according to Preparation Example 1A exhibits less surface damages upon the surface being polished thereby than the polishing slurry according to Comparative Preparation Example 1.

Figure 12A:
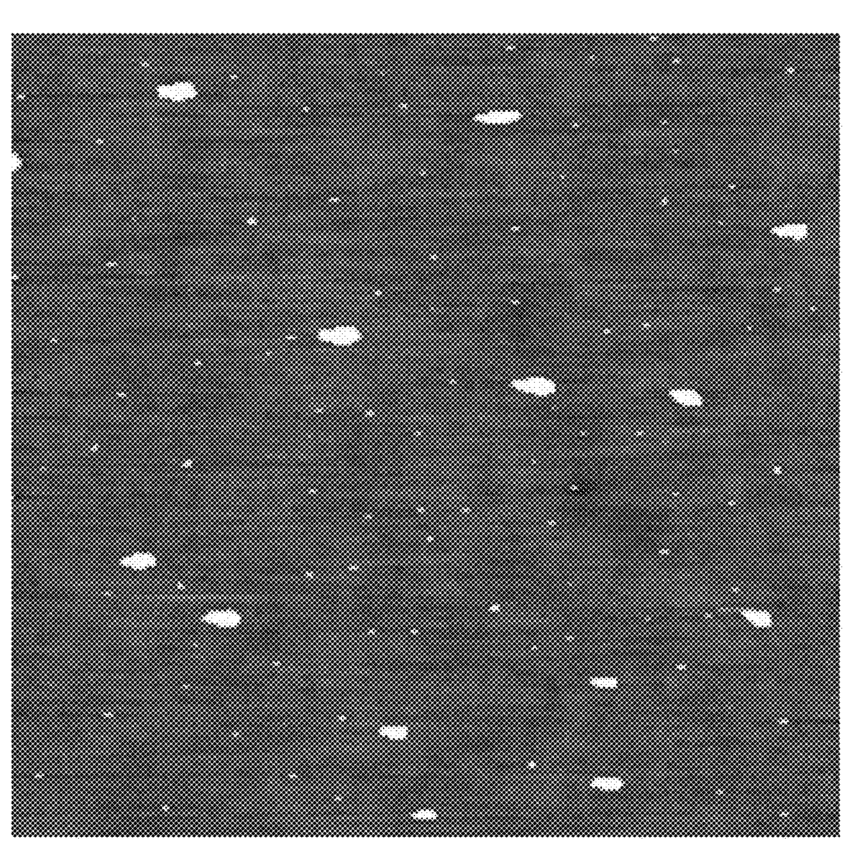
FIGS. 12A and 12B are electron micrographs of substrate surfaces polished using the polishing slurries according to Preparation Example 1A and Comparative Preparation Example 1, respectively.
Figure 12B:
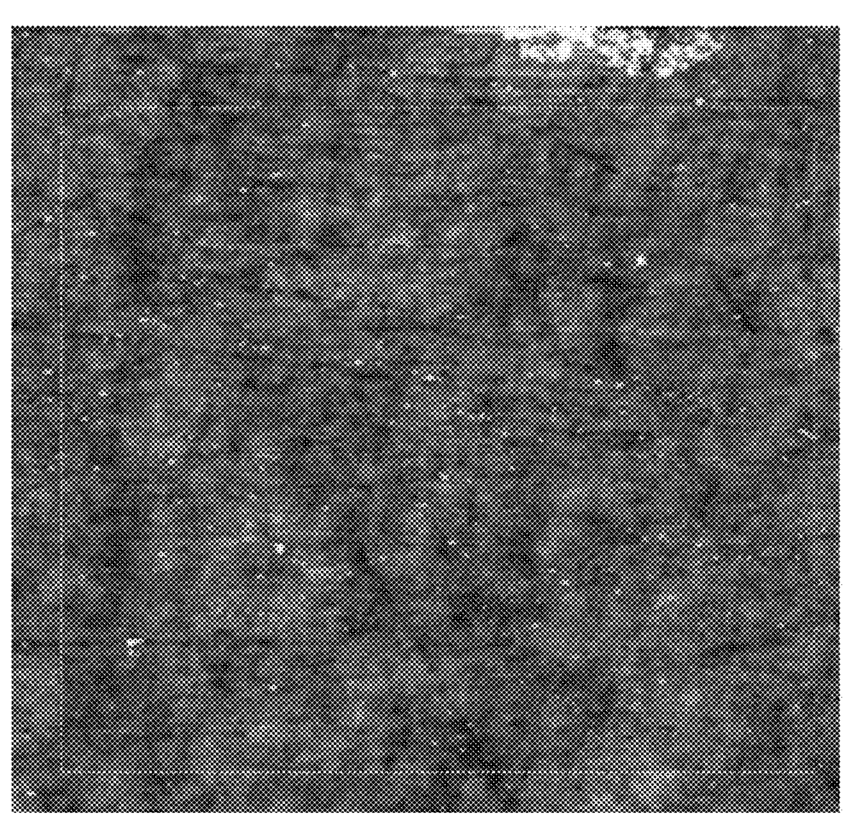

FIGS. 12A and 12B are electron micrographs of substrate surfaces polished using the polishing slurries according to Preparation Example 1A and Comparative Preparation Example 1, respectively. Referring to FIGS. 12A and 12B, the substrate polished by using the polishing slurry according to Preparation Example 1A exhibits almost no surface damage (surface scratch), compared with the substrate polished by using the polishing slurry according to Comparative Preparation Example 1. In FIG. 12A, a white spot is formed by ceria particles not removed but remaining on the substrate surface.

While the inventive concepts have been described in connection with what is presently considered to be practical example embodiments, it is to be understood that the inventive concepts are not limited to such example embodiments. On the contrary, the inventive concepts are intended to cover various modifications and equivalent arrangements included within the spirit and scope of the appended claims.

| <Description of Symbols> | |
|---|---|
| 1: composite abrasive | 3: host material |
| 5: abrasive particles | 10: semiconductor substrate |
| 20: interlayer insulating layer | 20a: trench |
| 30: barrier layer | 40: metal layer |
| 40a: buried metal layer | |
| 50: capping layer | |

What is claimed is:

1. A composite abrasive, comprising:

a host material having a two-dimensional planar structure, a layered structure, or both, and abrasive particles protruding from an exposed surface of the host material into an external environment that is external to the composite abrasive, wherein the host material defining the exposed surface of the host material has a Mohs hardness smaller than a Mohs hardness of the abrasive particles.

2. The composite abrasive of claim 1, wherein the host material has a Mohs hardness of less than or equal to about 5.

3. The composite abrasive of claim 1, wherein a difference in Mohs hardness between the Mohs hardness of the host material and the Mohs hardness of the abrasive particles is greater than or equal to about 4.

4. The composite abrasive of claim 1, wherein a binding force between the host material and the abrasive particles is greater than or equal to about 200 nN.

5. The composite abrasive of claim 1, wherein the host material has an aspect ratio of about 3:1 to about 1000:1.

6. The composite abrasive of claim 1, wherein the host material has a size of about 50 nm to about 100 μm.

7. The composite abrasive of claim 1, wherein the host material comprises an inorganic material.

8. The composite abrasive of claim 1, wherein the host material comprises graphite, graphene, graphene oxide, hexagonal boron nitride (h-BN), or any combination thereof.

9. The composite abrasive of claim 1, wherein the abrasive particles comprise oxide, nitride, fluoride, carbide, or any combination thereof.

10. The composite abrasive of claim 9, wherein the oxide comprises silicon oxide, cerium oxide, titanium oxide, zirconium oxide, aluminum oxide, molybdenum oxide, ruthenium oxide, tantalum oxide, tungsten oxide, or any combination thereof, the nitride comprises silicon nitride, aluminum nitride, titanium nitride, boron nitride, or any combination thereof, the fluoride comprises calcium fluoride ($CaF_2$), selenium fluoride ($SeF_4$), tellurium fluoride ($TeF_4$), or any combination thereof, and the carbide comprises tantalum carbide, boron carbide, or any combination thereof.

11. The composite abrasive of claim 1, wherein the abrasive particles have a size of less than or equal to about 100 nm.

12. The composite abrasive of claim 1, wherein the abrasive particles are included in the composite abrasive in an amount of about 0.01 wt % to about 10 wt % based on a total amount of the composite abrasive.

13. The composite abrasive of claim 1, wherein the abrasive particles have a Mohs hardness greater than about 5.

14. A composite abrasive, comprising:

a host material; and abrasive particles protruding from a surface of the host material, wherein a binding force between the host material and the abrasive particles is greater than or equal to about 200 nN.

15. The composite abrasive of claim 14, wherein the host material has a two-dimensional planar structure, a layered structure, or both.

16. A method of preparing a composite abrasive, the method comprising:

dissolving a precursor of abrasive particles in a solvent to prepare a solution; and dispersing a host material having a two-dimensional planar structure, layered structure, or both in the solution; and performing a heat treatment of the host material dispersed in the solution to obtain the composite abrasive of claim 1.

17. A polishing slurry comprising the composite abrasive of claim 1.

18. The polishing slurry of claim 17, wherein the polishing slurry comprises a plurality of composite abrasives, the plurality of composite abrasives including the composite abrasive, the plurality of composite abrasives each including respective host materials, and the respective host materials of the plurality of composite abrasives have a thickness variation of less than or equal to about 100 nm.

19. The polishing slurry of claim 17, wherein the composite abrasive is included in the polishing slurry in an amount of about 0.01 wt % to about 10 wt % based on a total amount of the polishing slurry.

20. The polishing slurry of claim 17, wherein the polishing slurry further comprises a chelating agent, an oxidizing agent, a surfactant, a dispersant, a pH adjusting agent, or any combination thereof.

* * * * *